US011642866B2

(12) United States Patent
Destombes et al.

(10) Patent No.: US 11,642,866 B2
(45) Date of Patent: May 9, 2023

(54) STRUCTURAL ROD FOR AN AIRCRAFT, COMPRISING A ROD BODY WITH A SANDWICH STRUCTURE

(71) Applicant: Airbus Operations (S.A.S.), Toulouse (FR)

(72) Inventors: Gautier Destombes, Toulouse (FR); Benoît Penven, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 17/218,542

(22) Filed: Mar. 31, 2021

(65) Prior Publication Data

US 2021/0308980 A1 Oct. 7, 2021

(30) Foreign Application Priority Data

Apr. 2, 2020 (FR) ...................................... 2003281

(51) Int. Cl.
*B32B 3/12* (2006.01)
*B32B 27/06* (2006.01)
(Continued)

(52) U.S. Cl.
CPC .............. *B32B 3/12* (2013.01); *B32B 27/065* (2013.01); *B32B 38/0004* (2013.01);
(Continued)

(58) Field of Classification Search
CPC ..... B32B 3/12; B32B 27/065; B32B 38/0004; B32B 2250/03; B32B 2262/106;
(Continued)

(56) References Cited

U.S. PATENT DOCUMENTS 1,370,023 A * 3/1921 Kempton ................. D07B 1/02
156/196
3,139,369 A * 6/1964 Sullivan ................. B32B 27/00
264/46.7
(Continued)

FOREIGN PATENT DOCUMENTS

CN 104057648 A * 9/2014 ............. B29C 70/70
DE 4439159 * 5/1965 ............... B32B 3/12
EP 3 590 833 A1 1/2020

OTHER PUBLICATIONS

French Search Report for Application No. 2003281 dated Nov. 19, 2020. 9 pages.

*Primary Examiner* — Linda L Gray

(74) *Attorney, Agent, or Firm* — KDW Firm PLLC

(57) ABSTRACT

A method for manufacturing structural rods to make it easier to manufacture a structural rod for an aircraft and to improve performance. Each rod includes a rod body and two end portions disposed at either end of the rod body along a longitudinal central rod axis, each end portion comprising at least one mounting lug that protrudes from the rod body along the longitudinal axis. The method includes producing a sandwich panel including two skins gripping a cellular inner body, at least one of the two outer skins having a skin extension for forming a part of the at least one mounting lug of at least one of the two end portions of the rod, and cutting the panel along parallel cutting lines to obtain the structural rods.

15 Claims, 11 Drawing Sheets

(51) Int. Cl.
  *B32B 38/00* (2006.01)
  *B65H 35/00* (2006.01)
  *B65H 35/02* (2006.01)

(52) U.S. Cl.
  CPC ..... *B32B 2250/03* (2013.01); *B32B 2262/106* (2013.01); *B32B 2266/06* (2013.01); *B32B 2266/08* (2013.01); *B32B 2305/022* (2013.01); *B32B 2605/18* (2013.01); *B65H 35/02* (2013.01); *Y10T 156/1067* (2015.01); *Y10T 156/1087* (2015.01)

(58) Field of Classification Search
  CPC ............ B32B 2266/06; B32B 2266/08; B32B 2305/022; B32B 2605/18; B65H 35/02; Y10T 156/1067; Y10T 156/1087
  USPC .................................................. 156/259, 271
  See application file for complete search history.

(56) References Cited

U.S. PATENT DOCUMENTS

| | | | | |
|---|---|---|---|---|
| 3,177,109 A | * | 4/1965 | Ziegler | ................... B29C 44/28 428/305.5 |
| 5,283,099 A | * | 2/1994 | Smith | ..................... B29C 70/26 428/184 |
| 2007/0152105 A1 | | 7/2007 | Filsinger et al. | |
| 2011/0033225 A1 | | 2/2011 | Buchin | |
| 2014/0013695 A1 | * | 1/2014 | Wolynski | ............... C04B 28/04 524/5 |
| 2018/0236732 A1 | | 8/2018 | Childers et al. | |

\* cited by examiner

STRUCTURAL ROD FOR AN AIRCRAFT, COMPRISING A ROD BODY WITH A SANDWICH STRUCTURE

CROSS-REFERENCE TO RELATED APPLICATION

This application claims priority to French patent application number 20 03281 filed on Apr. 2, 2020, the entire disclosure of which is incorporated by reference herein.

TECHNICAL FIELD

The disclosure herein relates to the field of structural rods for aircraft. Such rods are generally installed in the aircraft so as to transmit significant loads between the pieces that they connect.

These structural rods can for example be installed within the central wing box, or else within a landing gear.

The disclosure herein relates more preferentially, but not exclusively, to commercial airplanes.

BACKGROUND

The use of structural rods is widespread within aircraft.

Several types of rod exist, in particular metal rods, which have the advantage of being easy to manufacture. However, their high mass constitutes a significant drawback.

Furthermore, rods exist that are made from composite material, the mass of which is much lighter than that of metal rods. Nevertheless, the join between the rod body and the end portions often proves complicated to realize, especially when these end portions each comprise one or two mounting lugs.

SUMMARY

In order to overcome the drawback mentioned above, a first subject of the disclosure herein is a method for manufacturing a plurality of structural rods, each rod comprising a rod body and two end portions that are disposed at either end of the rod body along a longitudinal central rod axis, each end portion comprising at least one mounting lug that protrudes from the rod body along the longitudinal axis, characterized in that it comprises the following steps:
producing a sandwich panel comprising two skins gripping a cellular inner body, at least one of the two outer skins having a skin extension for forming a part of the at least one mounting lug of at least one of the two end portions of the rod; and
cutting the panel along parallel cutting lines so as to obtain the plurality of structural rods.

The disclosure herein is thus distinguished from the prior art by providing a sandwich structure, of which the one or more outer skins are extended so as to form a part of one or more mounting lugs. This design makes it possible to obtain a lighter mass, while affording excellent mechanical properties, in particular in bending in a given direction, and also in tension and in compression. The transfer of loads between the rod body and the end portions of the rod is made easier by the one or more skin extensions, which form an integral part of one or more mounting lugs. Finally, the design specific to the disclosure herein allows quick, easy and inexpensive manufacture, in particular by producing a sandwich panel that is then intended to be cut so as to obtain a plurality of rods according to the disclosure herein.

The disclosure herein preferably provides at least one of the following optional features, taken individually or in combination.

Two lateral webs are placed in a manner respectively covering two sides of the cellular internal core.

The cuts are made simultaneously.

At least one of the two outer skins has two skin extensions for forming a part of the at least one mounting lug of each of the two end portions of the rod. U-shaped closure pieces are joined to the ends of the cellular inner body.

Transition pieces are put in place, the transition pieces having:
a first part gripped between one of the two outer skins and an end of the internal core in the direction of the longitudinal central axis, the first part of the transition piece having a thickness that increases as it extends in the direction of the associated lug, the first part having a first chamfer pressed against a second chamfer made at the end of the internal core;
a second part that extends the first part and is secured to the skin extension that forms an integral part of the associated lug.

The second part of the transition piece has a constant or substantially constant thickness.

The cellular internal core is made:
from foam with closed or open pores, or
from honeycomb, or
using tubular elements that are secured to one another by being stacked in a stacking direction parallel to the longitudinal central axis, each tubular element having a cavity centered on a tubular element axis orthogonal to the longitudinal central axis of the rod.

At least one of the end portions of the rod has two facing mounting lugs, each of the two lugs having:
an external skin formed by the skin extension;
a central body formed by the second part of the transition piece; and
an internal skin formed by the closure piece of generally U-shaped section, the two legs of the U respectively forming the internal skin of each of the two facing lugs, and the base of the U being pressed against the end of the cellular internal core of the rod body, between the two lugs.

The sandwich panel is produced by hot pressing or in an autoclave.

The two opposite outer skins are each produced using a composite material, preferably a carbon fibre reinforced polymer material (CFRP).

The sandwich panel is produced by hot pressing or in an autoclave.

Finally; further subjects of the disclosure herein are a rod produced by such a method, and an aircraft comprising at least one structural rod produced by such a method.

Further advantages and features of the disclosure herein will become apparent from the following non-limiting detailed description.

BRIEF DESCRIPTION OF THE DRAWINGS

This description will be provided with reference to the appended drawings, in which.

DETAILED DESCRIPTION

Figure 1:
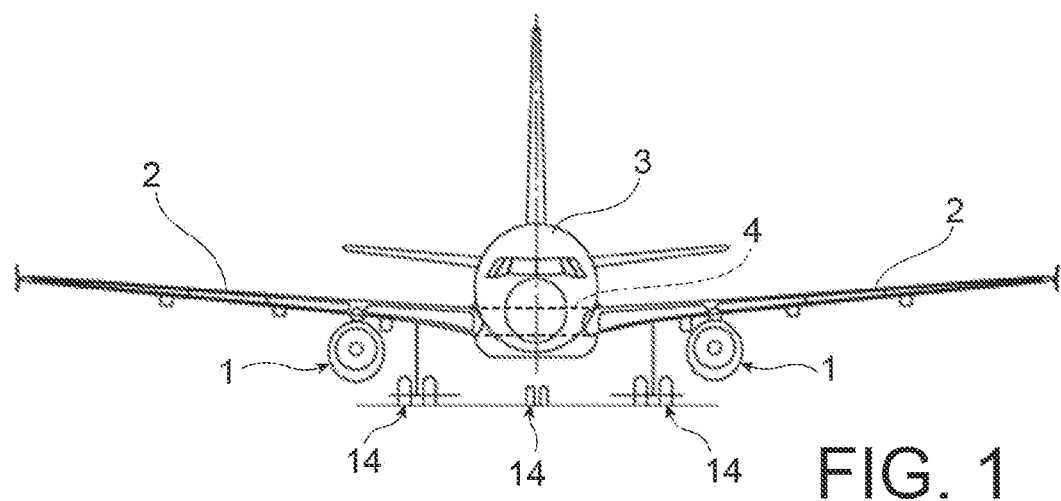
FIG. 1 shows a schematic front view of an aircraft.

FIG. 1 shows an aircraft 100 of the commercial airplane type, comprising two wings 2 that are fastened to a fuselage 3 and each support a turbomachine 1, such as a jet engine.

Figure 3:
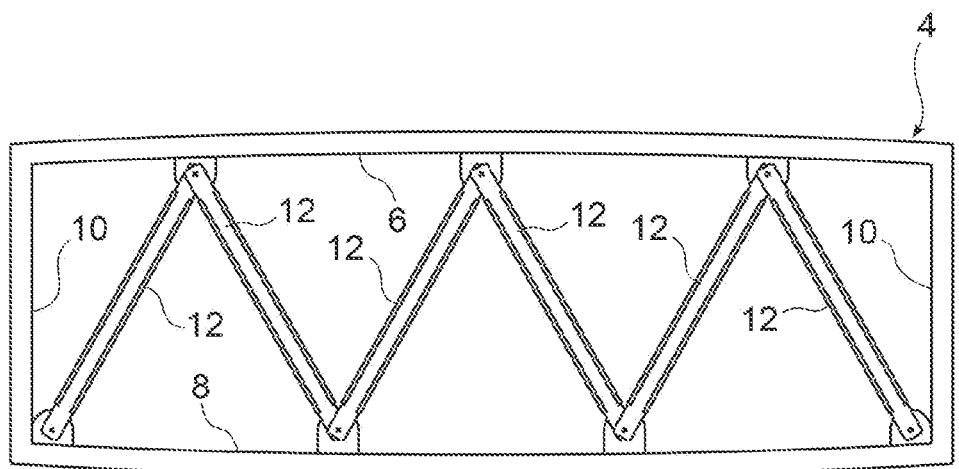
FIG. 3 shows a front view of a central wing box with which the aircraft in FIG. 1 is equipped.

The two wings 2 are fastened to one another by a central wing box 4, an example of which is shown in FIG. 3. This central wing box 4 is conventionally produced using an upper wall 6, a lower wall 8, lateral walls 10 and structural rods 12 connecting the two walls 6, 8.

Figure 2:
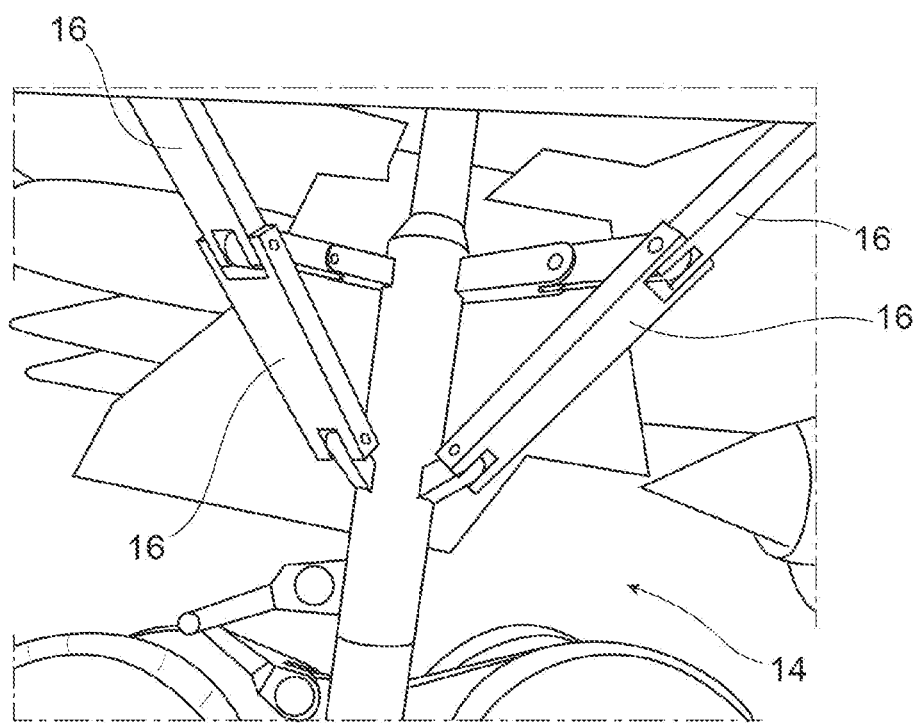
FIG. 2 shows a perspective view of one of the landing gears with which the aircraft in FIG. 1 is equipped.

The aircraft 100 is also equipped with a plurality of landing gears 14, an example of which is shown in FIG. 2. It conventionally has a plurality of articulated structural rods 16.

The disclosure herein relates to structural rods intended to equip the aircraft, such as the rods described above, which form an integral part of the central wing box 4 or of the landing gears 14. Nevertheless, other applications can be envisaged for the structural rod according to the disclosure herein, which rod can be incorporated in any aircraft airframe, without departing from the scope of this disclosure herein.

Figure 4:
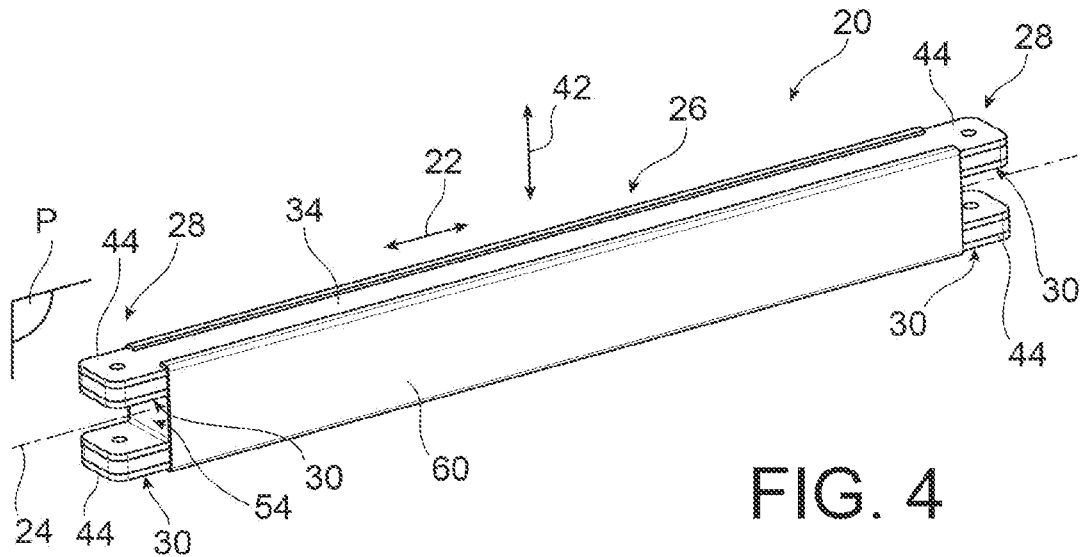
FIG. 4 shows a perspective view of a structural rod with which the aircraft in FIG. 1 is equipped, the rod being in the form of a first preferred embodiment of the disclosure herein.
Figure 5:
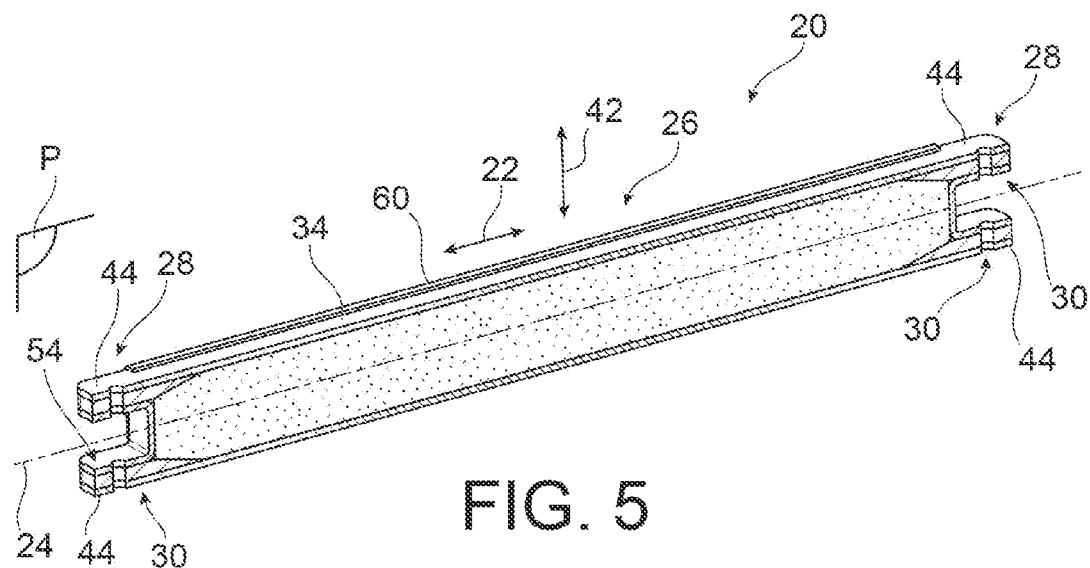
FIG. 5 shows a partial perspective view of the rod shown in the preceding figure, in section on the median longitudinal plane P in FIG. 4.
Figure 6:
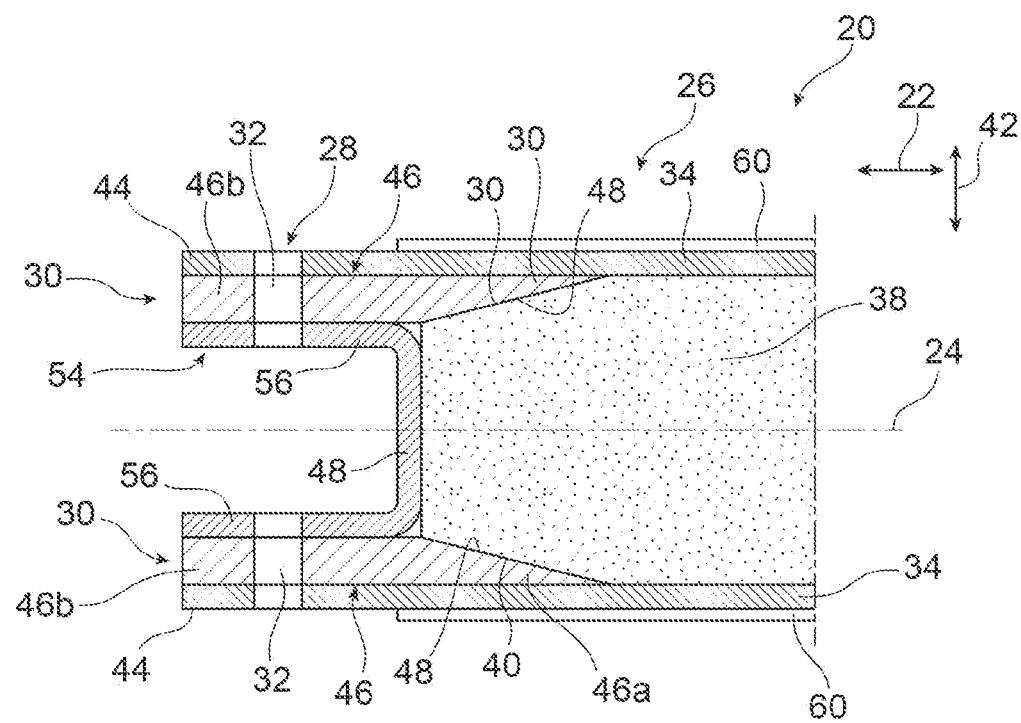
FIG. 6 shows an enlarged plan view of an end of the rod shown in FIG. 5.
Figure 7:
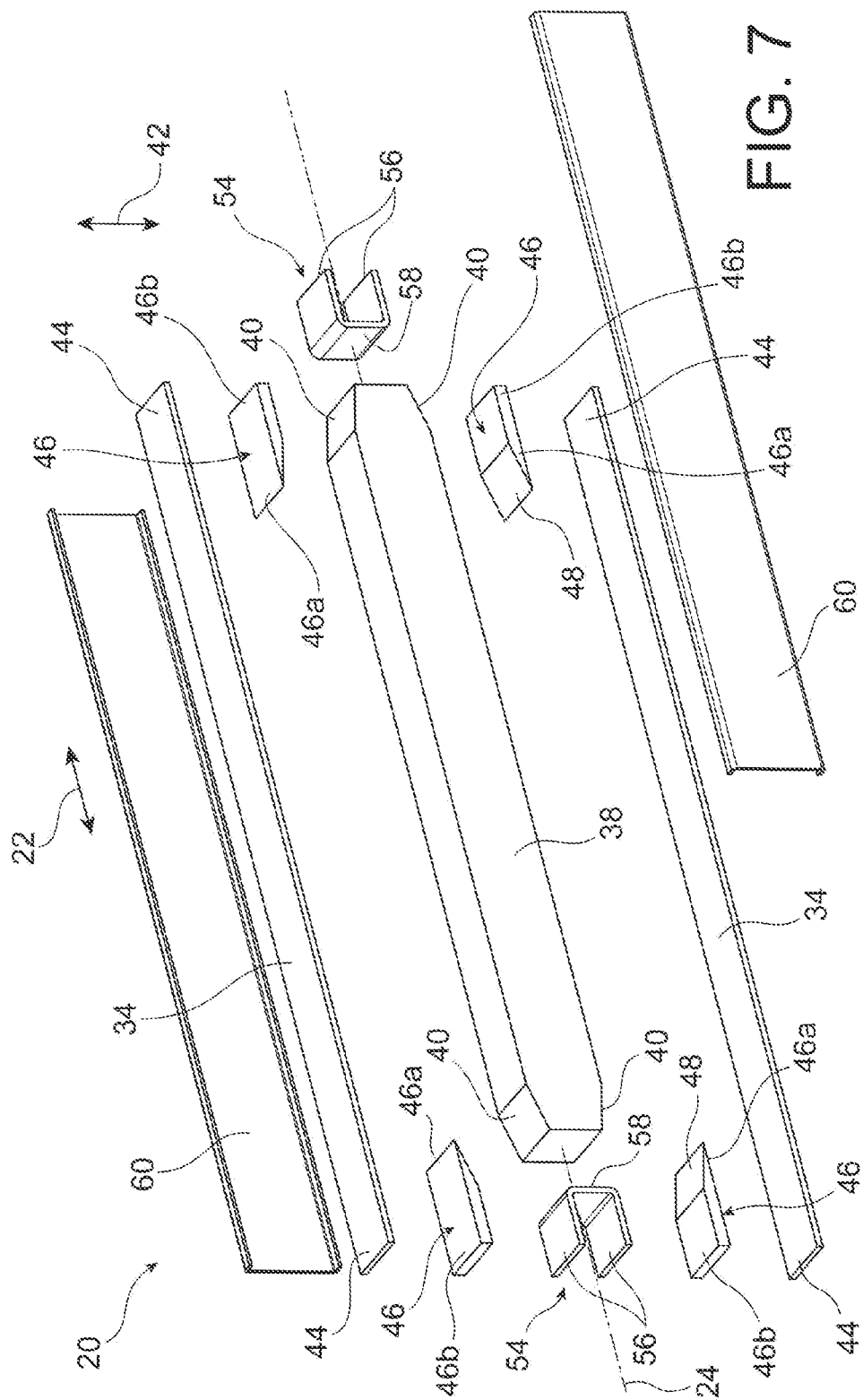
FIG. 7 shows an exploded perspective view of the rod shown in FIGS. 4 to 6.

With reference now to FIGS. 4 to 6, a structural rod 20 according to a first preferred embodiment of the disclosure herein is shown.

The structural rod 20 extends along a longitudinal central axis 24, parallel to a longitudinal direction 22 of this same rod. Overall, the rod 20 has a rod body 26 that extends along a great majority of the length of the rod, of which it constitutes the central portion with respect to the direction 22. At either end of the rod body 26, along the axis 24, two end portions 28 are provided. These end portions 28 have identical or different designs, but in all cases they allow the rod to be fastened to the two aircraft elements to be connected. In the first preferred embodiment that is envisaged, the two end portions 28 have identical designs, being arranged symmetrically with respect to a median transverse plane of the rod. Consequently, only one of the two end portions 28 will be described below.

The end portion 28 has at least one mounting lug 30, arranged so as to protrude from the rod body 26 along the axis 24. Preferably, two mounting lugs 30 equip the end portion 28, so as to form a fastening clevis, being parallel or substantially parallel to one another.

Each mounting lug 30 has an orifice 32 passing through it so as to receive a fastening member (not shown), such as a hinge pin intended to pass through the clevis.

One of the particular features of the disclosure herein resides in the design of the rod 20, of which the rod body 26 has a sandwich structure. More specifically, the rod body 26 is made from two opposite outer skins 34, between which is gripped a cellular internal core 38, in this case a foam. The foam may have closed or open pores, exhibiting high stiffness. It may for example be a metal foam, but any foam that is the to be rigid is considered appropriate. In general, it can be a foam that is dense (density of between 30 and 300 kg/m$^3$) and rigid, has a high compressive strength, is compatible with the transformation temperatures and is capable of adhesively bonding to composite materials.

At each of the two ends of the foam core 38, which are opposite to one another in the direction 22, a chamfer 40 is provided on each of the upper face and the lower face. The two opposite chamfers 40 bring about a reduction in the thickness of the foam core 38, in the direction 42 in which the elements of the sandwich structure are stacked. The stacking direction 42 is orthogonal to the longitudinal direction 22 of the rod.

Each of the two outer skins 34 has, at its two respective ends that are opposite to one another in the direction 22, two skin extensions 44 intended to form a part of one of the two mounting lugs 30 of each of the two end portions 28.

Furthermore, for each lug 30, a transition piece 46 is provided, one part of which is located in the rod body 26 and the other part of which is incorporated in the lug 30 in question. More specifically, the transition piece 46 first of all has a first part 46a gripped between one of the two outer skins 34 and one of the ends of the internal core 38. This first part 46a, which has a triangular overall shape, thus has a thickness that increases as it extends in the direction of its associated lug 30. This increasing thickness is embodied by the presence of a chamfer 48, called first chamfer, which is pressed against the chamfer 40 of the core 38, called second chamfer. The cooperation of these two chamfers 40, 48 allows the rod body 26 to have a constant overall thickness, as far as the terminal part of its two opposite longitudinal ends.

The transition piece 46 also has a second part 46b that extends the first part 46a and is integral therewith. The second part 46b has a constant or substantially constant thickness and is parallelepipedal.

With this design, each of the two lugs 30 of the clevis is formed by stacking, in the direction 42, an outer skin formed by the skin extension 44, a central body formed by the second part 46b of the transition piece, and an internal skin. These three stacked elements are secured to one another.

As regards the two internal skins of the two lugs 30 forming the clevis, these are formed by a closure piece 54 of generally U-shaped section, as is most clearly visible in FIG. 6. Specifically, the two legs 56 of the U respectively form the internal skin of each of the two facing lugs 30. In addition, the base of the U 58 is pressed against the end of the internal core 38 of which the thickness is reduced by the chamfers 40, being situated between the base of the two lugs 30.

Finally, in order to laterally form the rod and isolate the internal core 38 from the outside, two lateral webs 60 covering the two opposite sides of the core 38 are provided. Each lateral web 60 has two lips that are opposite one another in the direction 42, these lips pressing respectively against the two outer skins 34, so as to better contain the core 38.

With the exception of the internal core 38, all of the constituent elements of the rod that have been described above are preferably made using a composite material, and more preferentially a carbon fibre reinforced polymer material, also known as CFRP. Other composite materials can nevertheless be used, without departing from the scope of the disclosure herein.

There will now be described a method for manufacturing a plurality of structural rods 20, such as the rod that has just been described above.

Figure 9:
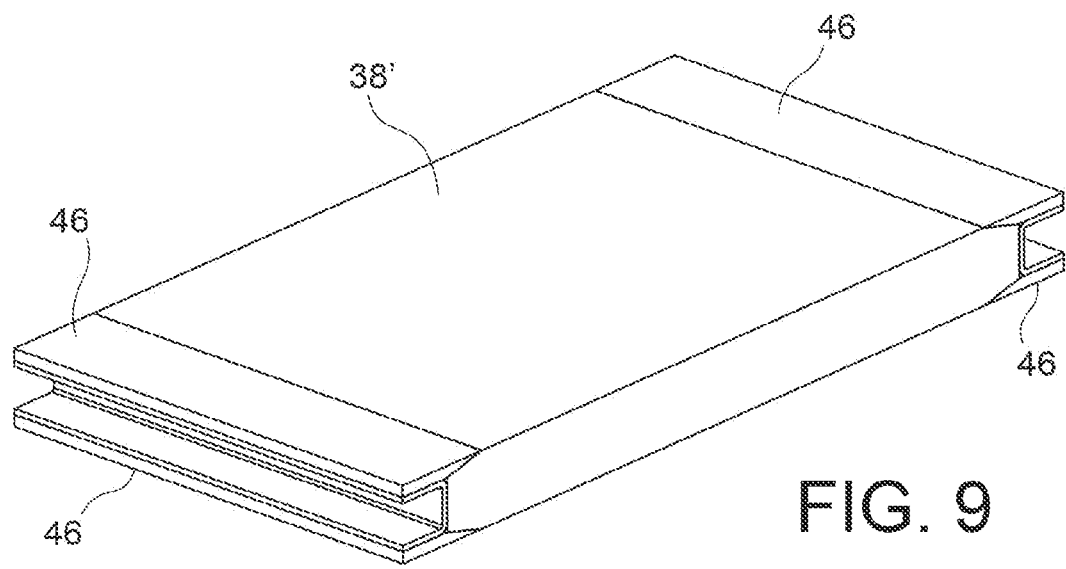
FIG. 9 is a perspective view schematically depicting a subsequent step for producing the sandwich panel.
Figure 10:
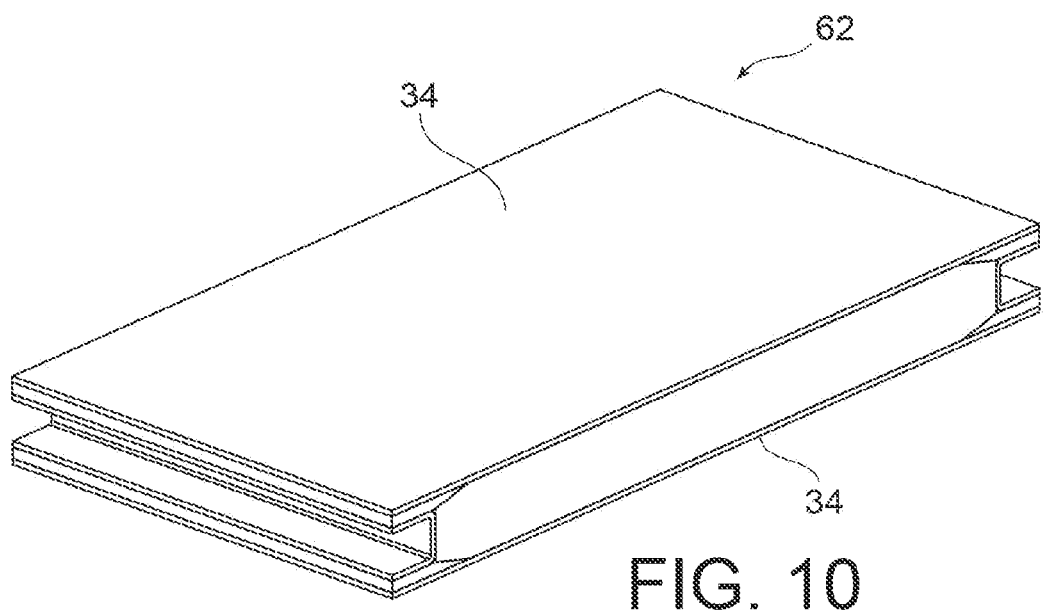
FIG. 10 is a perspective view schematically depicting a further subsequent step for producing the sandwich panel.

First of all, various elements are joined together so as to produce a sandwich panel. During this joining together, which will be described with reference to FIGS. 8 to 10, the elements adhere to one another on account of the nature of their material, or on account of the interposition of adhesive layers.

Figure 8:
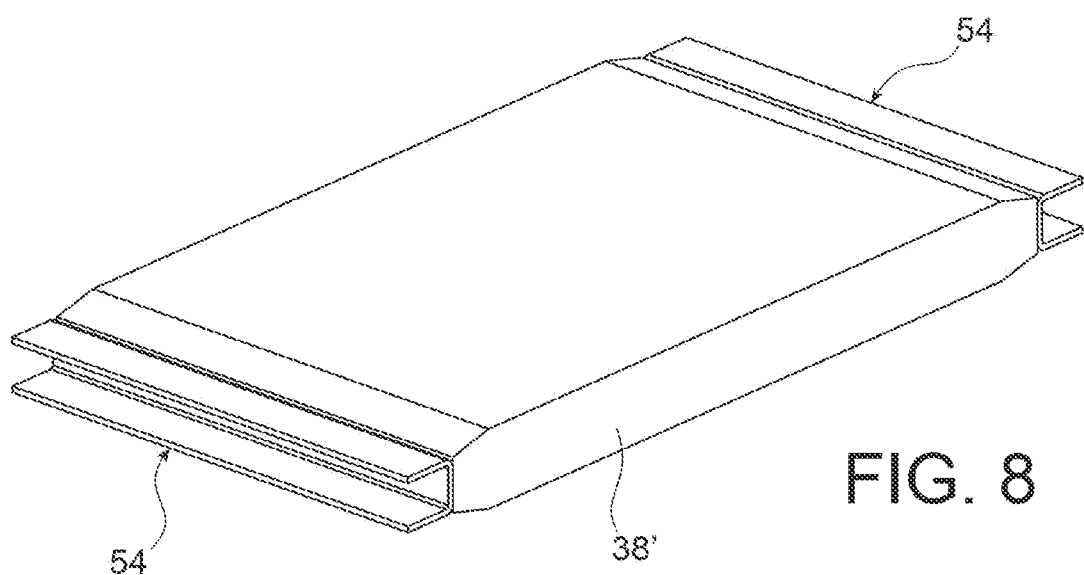
FIG. 8 is a perspective view schematically depicting a step for producing a sandwich panel, with a view to manufacturing a plurality of structural rods.
Figure 16:
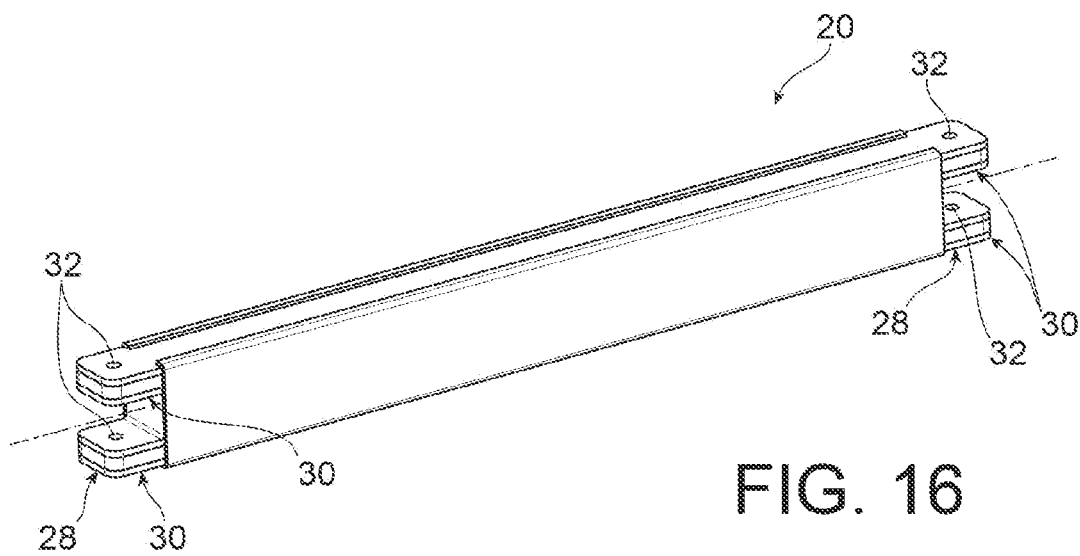
FIG. 16 is a perspective view schematically depicting a step of finishing the end portions of one of the structural rods.

First of all, with reference to FIG. 8, the U-shaped closure pieces 54 are joined to the ends of a cellular inner body in the form of a foam plate 38', which has already been chamfered. Next, with reference to FIG. 9, the transition pieces 46 are put in place, followed by the outer skins 34, as can be seen in FIG. 16.

Figure 11:
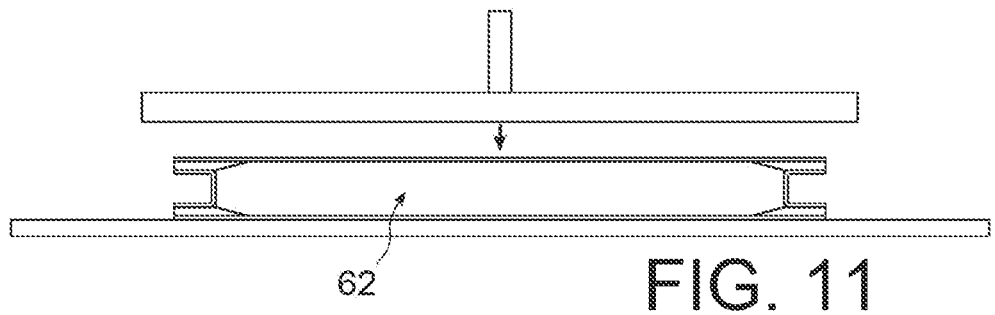
FIG. 11 is a plan view schematically depicting a step of curing the sandwich panel.
Figure 12:
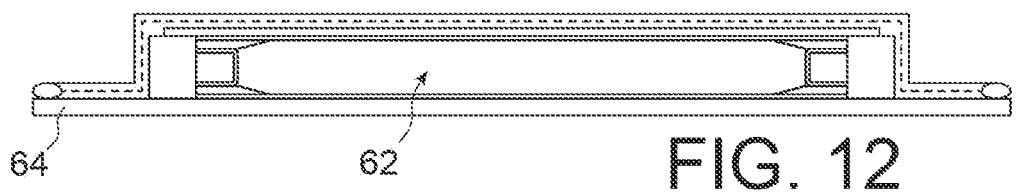
FIG. 12 is a plan view schematically depicting an alternative embodiment for curing the sandwich panel.

The panel 62 thus obtained then undergoes a step of curing, by polymerization. This curing step is carried out in a conventional manner, for example by hot pressing the panel 62, as is depicted schematically in FIG. 11, or in an autoclave 64, as can be seen in FIG. 12.

Figure 13:
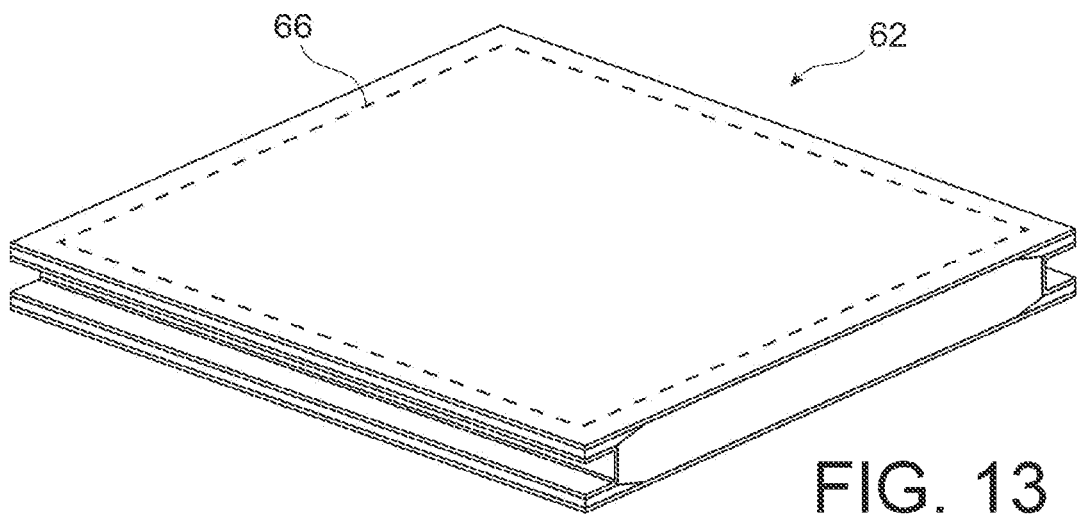
FIG. 13 is a perspective view schematically depicting a step of trimming the sandwich panel.

When the polymerization is complete, the resulting hardened panel 62 is trimmed along its periphery, along a trimming line 66 shown in FIG. 13. The aim of this trimming is to obtain a panel with protruding edges.

Figure 14:
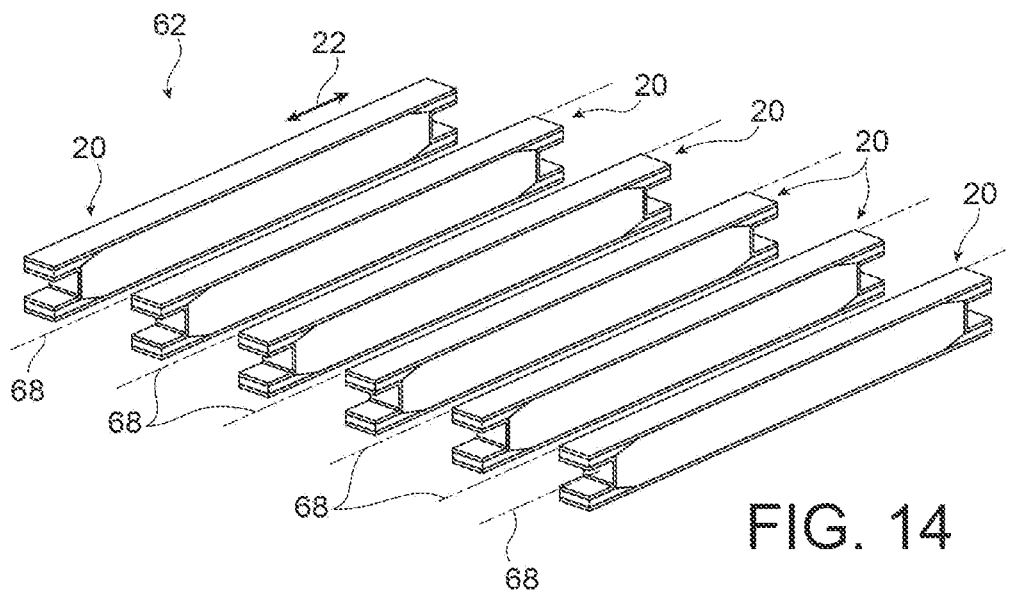
FIG. 14 is a perspective view schematically depicting a step of cutting the sandwich panel so as to obtain the structural rods.

Next, the panel 62 is cut multiple times, along mutually parallel cutting lines 68 that are also parallel to the longitudinal direction 22 of the rods 20 obtained after these cuts. FIG. 14 schematically shows these cuts, which can be made in succession, or simultaneously for increased productivity.

A single panel 62 can give rise to a large number of structural rods 20, this number depending on the initial size of the panel and on the size of the desired rods.

Figure 15:
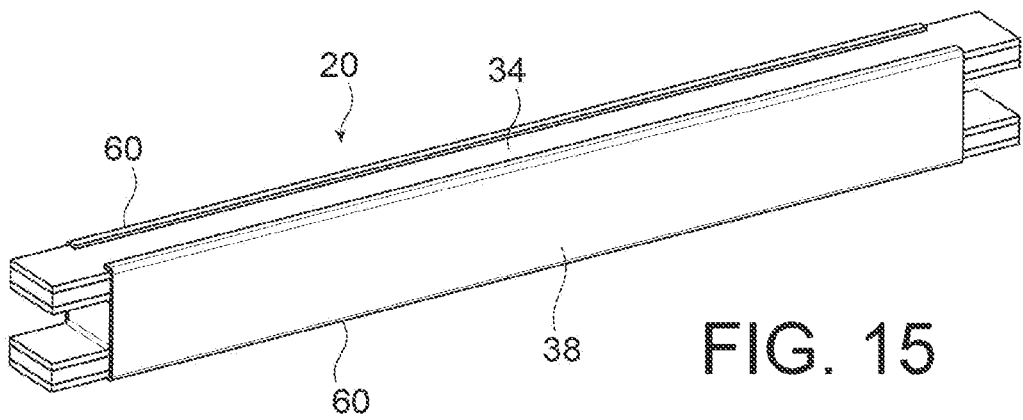
FIG. 15 is a perspective view schematically depicting a step of fastening the lateral webs to the structural rods.

Once the rods 20 have been obtained, the lateral webs 60 are placed, for example by adhesive bonding to the outer skins 34, so as to close a sealed envelope in which the cellular internal core 38 is located. This step is schematically depicted in FIG. 15.

Finally, the method for manufacturing the rods 20 is completed by the optional machining of the mounting lugs 30 and the drilling of their orifices 32. The machining consists in or comprises rounding the lugs 30 at each of the two end portions 28, as can be seen in FIG. 16.

Figure 17:
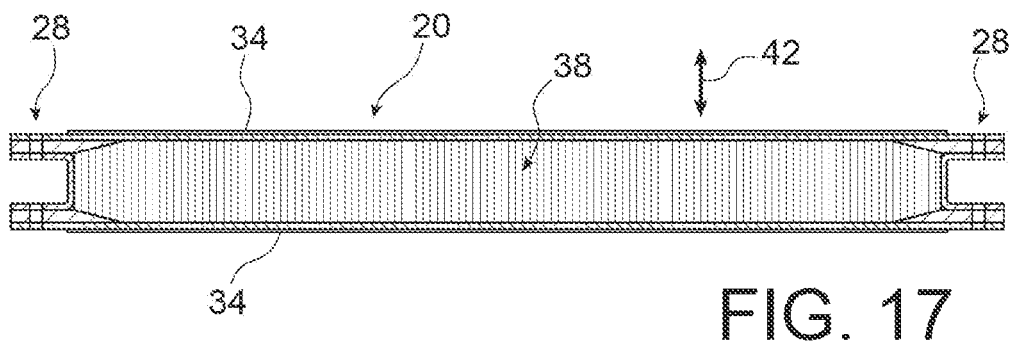
FIG. 17 is a perspective view of a structural rod similar to that in FIG. 4, according to an alternative embodiment.

With reference now to FIG. 17, an alternative embodiment is shown, in which the cellular internal core 38 is replaced by a honeycomb bar. The cells of the honeycomb bar are oriented parallel to the direction 42 in which the elements of the sandwich structure are stacked.

The other elements of the rod 20 are similar to those presented in the description of the first preferred embodiment, and the manufacturing method likewise remains identical or similar.

Figure 18:
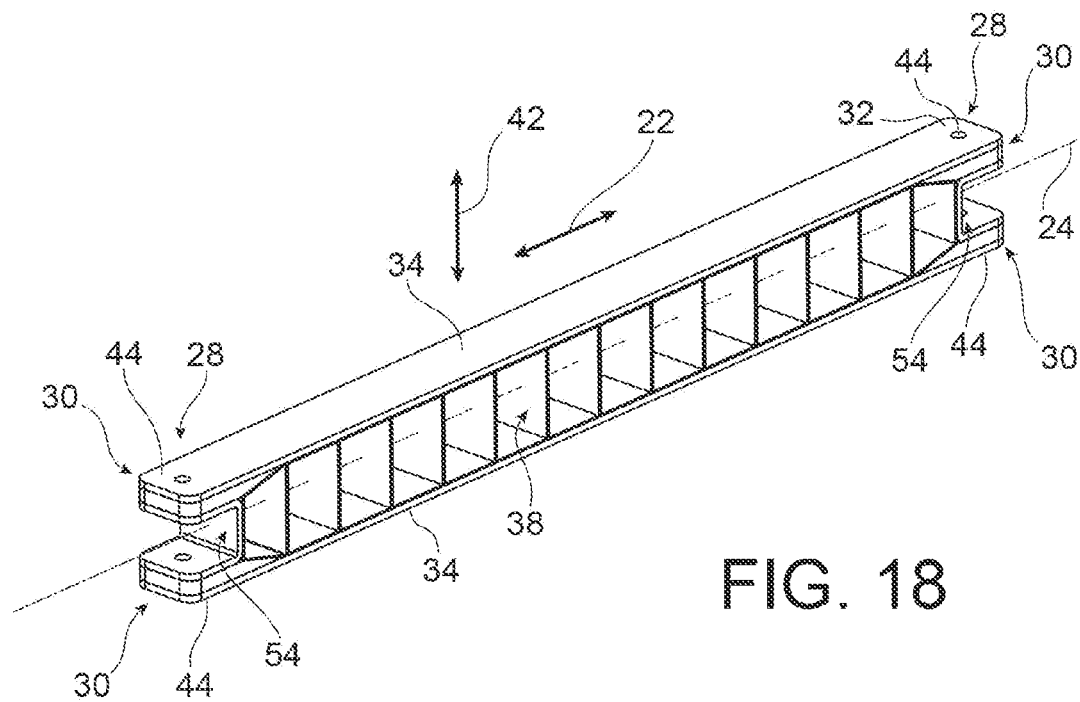
FIG. 18 shows a perspective view of another structural rod in the form of a second preferred embodiment of the disclosure herein.
Figure 19:
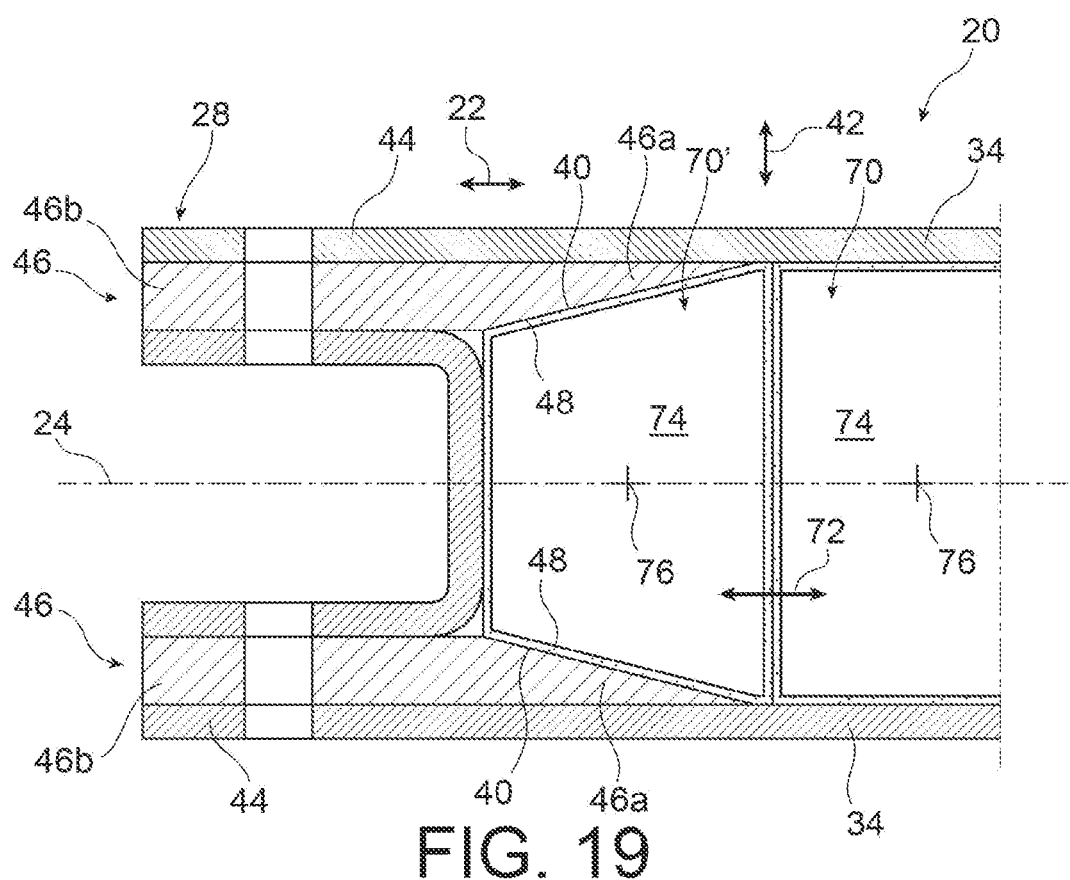
FIG. 19 shows a partial enlarged plan view of an end of the rod shown in FIG. 18.
Figure 20:
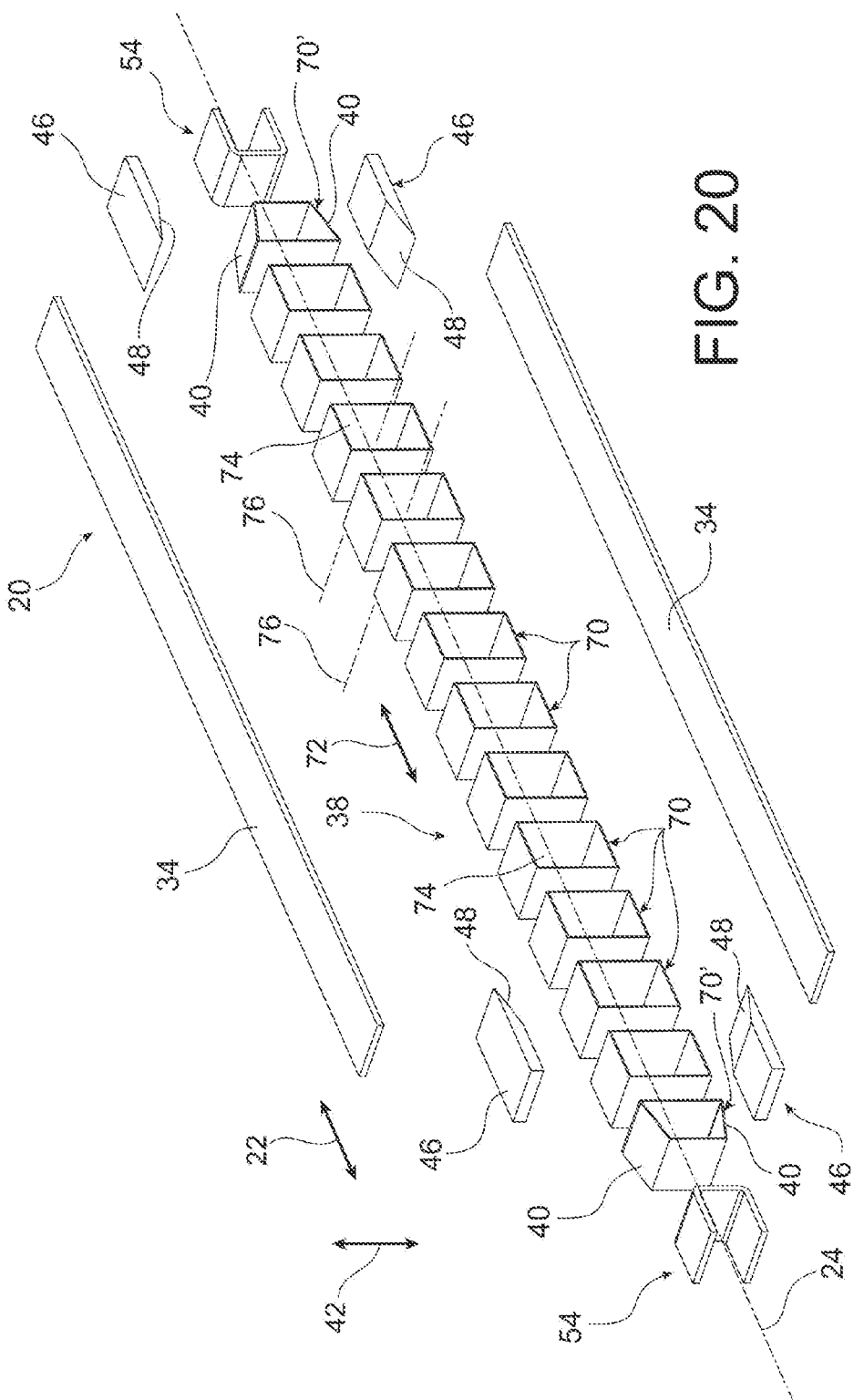
FIG. 20 shows an exploded perspective view of the rod shown in FIGS. 18 and 19.

With reference now to FIGS. 18 to 20, a rod 20 according to a second preferred embodiment of the disclosure herein will be described. The rod 20 has a large number of features in common with the rod described above in the context of the first preferred embodiment. Thus, in the figures, elements that bear the same numerical references correspond to elements that are identical or similar.

In the second preferred embodiment, it is essentially the nature of the cellular internal core 38 that is different, and the lateral webs 60 can also optionally be omitted.

The cellular internal core 38 is in this case produced using tubular elements 70, 70' that are secured to one another by being stacked in a stacking direction 72, corresponding to the longitudinal direction 22 of the rod 20 and parallel to the axis 24. Each tubular element 70, 70' has a cavity 74 centered on a tubular element axis 76 orthogonal to the axis 24 of the rod. The cavities 74, also called cells, thus remain open laterally on both sides of the rod 20, on the side of the ends of the tubular elements. For example, between five and thirty of them are provided, and preferably more than ten.

With the exception of the two tubular elements 70' situated respectively at the two opposite longitudinal ends of the core 38, these tubular elements 70 preferably have a square or rectangular section. For the two end tubular elements 70', the section has a trapezoidal shape, so that each of the two of them defines the two second chamfers 40 intended to cooperate with the transition pieces 46.

Figure 21:
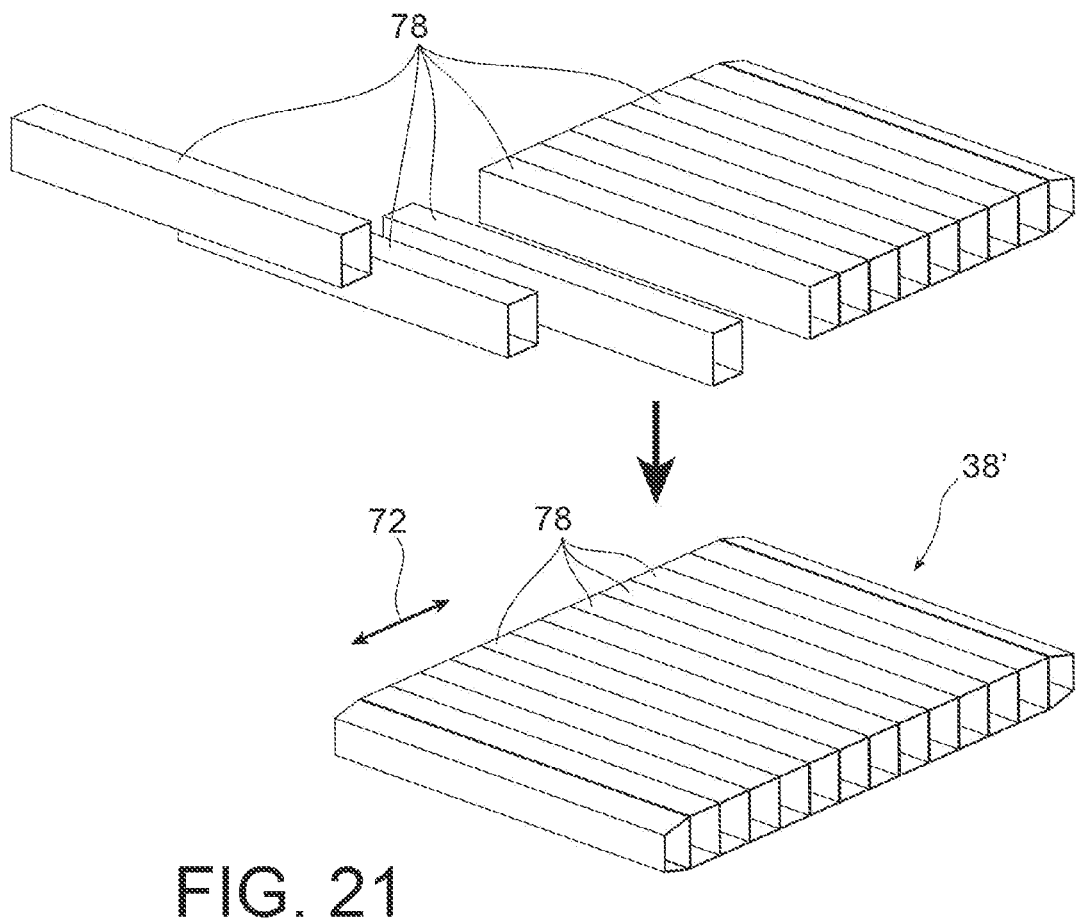
FIG. 21 is a perspective view schematically depicting a step of manufacturing the cellular internal core of the rod shown in FIGS. 18 to 20.

In order to manufacture the rods 20, provision is in this case also made to manufacture a sandwich panel, of which the production of the cellular inner body 38' is schematically depicted in FIG. 21. It consists in or comprises arranging a plurality of tubes 78 adjacent to one another, in the stacking direction 72 orthogonal to the axis of these tubes 78.

Once the central plate 38' has been assembled in this way, the operations of joining together the other components and the step of curing the panel are then carried out in a manner identical or similar to that set out in the context of the description of the first preferred embodiment.

Figure 22:
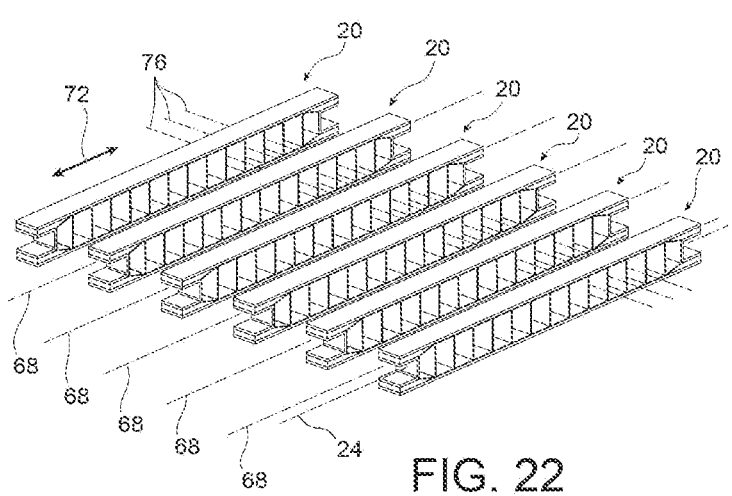
FIG. 22 is a perspective view schematically depicting a step of cutting a sandwich pan& obtained with the core shown in FIG. 21 so as to obtain the structural rods.

The cuts are then made along cutting lines 68 that are parallel to the stacking direction 72 and therefore orthogonal to the tubular element axes 76, as is schematically depicted in FIG. 22.

By virtue of the skin extensions 44, the disclosure herein allows better transmission of the loads from the rod body 26 to the mounting lugs 30. This transmission of loads is further improved by the presence of the transition pieces 46, ensuring the join between the rod body 26 and the end portions 28.

Even with a lighter mass, the structural rod 20 according to the disclosure herein affords excellent mechanical properties, in particular in tension and in compression, but also in bending in a direction orthogonal to the longitudinal direction 22 of this rod.

Finally, the design of the structural rod 20 allows quick, easy and inexpensive manufacture, in particular by producing a sandwich panel with a large surface area, which is then intended to be cut so as to obtain a plurality of identical rods.

Of course, a person skilled in the art can make various modifications to the disclosure herein which has just been described, purely by way of non-limiting examples, and within the limits of the scope of the appended claims.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" by either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing a plurality of structural rods, the method comprising:
   providing a cellular inner body;
   arranging two outer skins on opposing sides of the cellular inner body to form a sandwich panel; and
   cutting the sandwich panel along parallel cutting lines, through the cellular inner body and the two outer skins, to produce the plurality of structural rods;
   wherein each of the plurality of structural rods comprises a rod body and two end portions disposed on opposing ends of the rod body along a longitudinal central axis thereof;
   wherein, at each of the two end portions, there are one or more mounting lugs that protrude from the rod body along the longitudinal central axis; and
   wherein one or both of the two outer skins have one or more skin extensions, each of which forms a part of one of the one or more mounting lugs of one of the two end portions of each of the plurality of structural rods.

2. The method according to claim 1, comprising, after the sandwich panel has been cut to produce the plurality of structural rods, arranging, for each of the plurality of structural rods, two lateral webs such that each of the two lateral webs covers one of two opposing sides of the cellular inner body.

3. The method according to claim 1, wherein cutting the sandwich panel along the parallel cutting lines comprises cutting along the parallel cutting lines simultaneously.

4. The method according to claim 1, wherein the one or more skin extensions comprise two skin extensions, each of which is provided at one of the two end portions of each of the plurality of structural rods.

5. The method according to claim 1, comprising joining a closure pieces at each of two opposing ends of the cellular inner body along the longitudinal central axis of the rod body to be formed; wherein cutting through the sandwich panel comprises cutting through, in producing each of the plurality of structural rods, the closure pieces.

6. The method according to claim 1, wherein the cellular inner body is made:
   from foam with closed or open pores; or
   from honeycomb; or
   using tubular elements that are secured to one another by being stacked in a stacking direction, which is parallel to the longitudinal central axis of the rod body to be formed, each of the tubular elements having a cavity centered on a tubular element axis, which is orthogonal to the longitudinal central axis body to be formed of the rod.

7. The method according to claim 5, comprising positioning one or more transition pieces at one or both of two opposing ends of the cellular inner body, each of the one or more transition pieces comprising:
   a first part, which is positioned between one of the two outer skins and a chamfer formed at a respective one of the two opposing ends of the cellular inner body, wherein the first part has a thickness that increases as it extends in a direction of the respective one of the two opposing ends to form a first chamfer that is pressed against the chamfer made at the respective one of the two opposing ends of the cellular inner body; and
   a second part that extends the first part and is secured to the skin extension to form an integral part of an associated mounting lug of the one or more mounting lugs with which the second part is associated at the respective one of the two opposing ends of the cellular inner body; and
   wherein at least one of the end portions of the rod has two facing mounting lugs, each of the two facing mounting lugs having:
      an external skin formed by the skin extension;
      a central body formed by the second part of the transition piece; and
      an internal skin formed by a respective one of the closure pieces;
      wherein each of the closure pieces have a generally U-shaped section with two legs, which respectively form the internal skin of each of the two facing mounting lugs, and a base, which is pressed against a respective one of the opposing ends of the cellular inner body of the rod body, between the two facing mounting lugs.

8. The method according to claim 1, wherein the sandwich panel is produced by hot pressing or in an autoclave.

9. A method for manufacturing a plurality of structural rods, the method comprising:
   providing a cellular inner body;
   arranging two outer skins on opposing sides of the cellular inner body to form a sandwich panel;
   positioning one or more transition pieces at one or both of two opposing ends of the cellular inner body, each of the one or more transition pieces comprising:
      a first part, which is positioned between one of the two outer skins and a chamfer formed at a respective one of the two opposing ends of the cellular inner body, wherein the first part has a thickness that increases as it extends in a direction of the respective one of the two opposing ends to form a first chamfer that is pressed against the chamfer made at the respective one of the two opposing ends of the cellular inner body; and
      a second part that extends the first part and is secured to skin extension to form an integral part of an associated mounting lug of one or more mounting lugs with which the second part is associated at the respective one of the two opposing ends of the cellular inner body; and cutting the sandwich panel along parallel cutting lines, through the cellular inner body and the two outer skins, to produce the plurality of structural rods;

wherein each of the plurality of structural rods comprises a rod body and two end portions disposed on opposing ends of the rod body along a longitudinal central axis thereof;

wherein, at each of the two end portions, there are one or more mounting lugs that protrude from the rod body along the longitudinal central axis; and wherein one or both of the two outer skins have one or more skin extensions, each of which forms a part of one of the one or more mounting lugs of one of the two end portions of each of the plurality of structural rods.

10. The method according to claim 9, comprising, after the sandwich panel has been cut to produce the plurality of structural rods, arranging, for each of the plurality of structural rods, two lateral webs such that each of the two lateral webs covers one of two opposing sides of the cellular inner body.

11. The method according to claim 9, wherein cutting the sandwich panel along the parallel cutting lines comprises cutting along the parallel cutting lines simultaneously.

12. The method according to claim 9, wherein the skin extensions comprise two skin extensions, each of which is provided at one of the two end portions of each of the plurality of structural rods.

13. The method according to claim 9, comprising joining a closure piece at each of two opposing ends of the cellular inner body along the longitudinal central axis; wherein cutting through the sandwich panel comprises cutting through, in producing each of the plurality of structural rods, the closure pieces.

14. The method according to claim 9, wherein the cellular inner body is made:

from foam with closed or open pores; or from honeycomb; or using tubular elements that are secured to one another by being stacked in a stacking direction, which is parallel to the longitudinal central axis, each of the tubular elements having a cavity centered on a tubular element axis, which is orthogonal to the longitudinal central axis of the rod.

15. The method according to claim 9, wherein the sandwich panel is produced by hot pressing or in an autoclave.

* * * * *